Nov. 28, 1961  L. M. BUTTERFIELD  3,010,578
MACHINE FOR GRADING ARTICLES BY WEIGHT
Filed Jan. 21, 1959  5 Sheets-Sheet 1

INVENTOR
L.M. BUTTERFIELD
BY John N. Randolph
ATTORNEY

Nov. 28, 1961 L. M. BUTTERFIELD 3,010,578
MACHINE FOR GRADING ARTICLES BY WEIGHT
Filed Jan. 21, 1959 5 Sheets-Sheet 3

INVENTOR
L. M. BUTTERFIELD
BY John N. Randolph
ATTORNEY

Nov. 28, 1961 L. M. BUTTERFIELD 3,010,578
MACHINE FOR GRADING ARTICLES BY WEIGHT
Filed Jan. 21, 1959 5 Sheets-Sheet 4

INVENTOR
L. M. BUTTERFIELD
BY John N. Randolph
ATTORNEY

United States Patent Office 3,010,578
Patented Nov. 28, 1961

3,010,578
MACHINE FOR GRADING ARTICLES BY WEIGHT
Louis M. Butterfield, Post Road, Kittery, Maine
Filed Jan. 21, 1959, Ser. No. 788,211
7 Claims. (Cl. 209—121)

This invention relates to a novel machine for grading or sorting articles by weight, and has for a primary object to provide a machine which is especially adapted for grading eggs, but which may be readily utilized for grading other small articles.

Another object of the invention is to provide a machine including a plurality of weighing stations disposed in alignment with one another and responsive to progressively diminishing weights for sorting or grading articles advanced successively to and deposited upon weighing scales of said weighing stations by a carrier means moving in a manner to pick up the articles to be graded from a loading station for deposit upon the scale of an adjacent weighing station, and which carrier simultaneously picks up other articles, not yet graded, from scales of the weighing stations, for deposit onto the scales of succeeding weighing stations.

A further object of the invention is to provide a grading machine wherein the handling of the articles and the movement thereof from one to another of the weighing stations is accomplished in a manner to prevent injury to the articles being graded.

A further object of the invention is to provide means associated with an article feeder of the machine, and operated in part by movement of the article carrier, for supplying articles intermittently to the loading station of the machine and in timed relation to movement of the carrier.

A further object of the invention is to provide a machine having means for momentarily locking tiltable weighing scales against tilting movement as the articles are being deposited from the carrier onto the weighing scales, so that tilting movement of the scales, when thereafter unlocked, can be effected solely by the weight of the articles.

A further object of the invention is to provide a device the operation of which is synchronized with that of the article carrier for moving the sorted articles away from the weighing stations.

Still a further object of the invention is to provide a machine having novel driven means for supporting an article carrier for longitudinal and up and down reciprocating movement of the carrier relative to parts of the machine from which the articles to be graded are picked up and on which said articles are deposited.

Various other objects and advantages of the invention will hereinafter become more fully apparent from the following description of the drawings, illustrating a presently preferred embodiment thereof, and wherein:

FIGURE 18 is an enlarged fragmentary cross sectional view in detail, taken substantially along the line 18—18 of FIGURE 6.

Figures 2, 15:
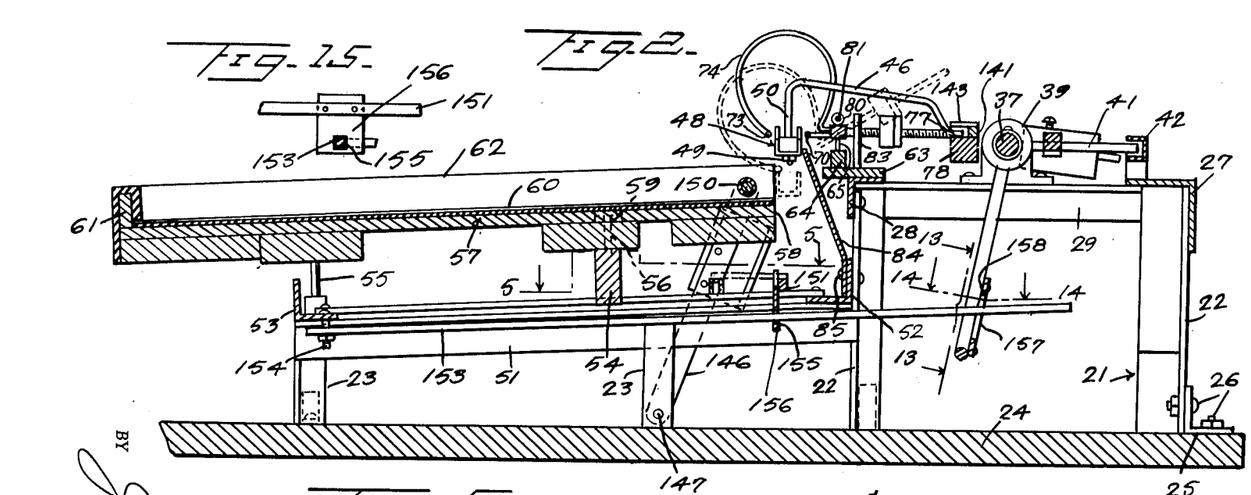
FIGURE 2 is an enlarged cross sectional view thereof, taken substantially along a plane as indicated by the line 2—2 of FIGURE 1.
FIGURE 15 is a fragmentary vertical sectional view in detail, taken substantially along a plane as indicated by the line 15—15 of FIGURE 5.

Referring more specifically to the drawings, the article grading machine in its entirety and comprising the invention is designated generally 20 and includes a rigid supporting frame, designated generally 21. The supporting frame 21 is composed primarily of angle iron and includes a plurality of upright supporting legs 22 and 23 the lower ends of which are preferably anchored to a base member 24 by angle brackets 25 and nut and bolt fastenings 26. The frame 21 includes two longitudinal rows of supporting legs 22, extending from end-to-end thereof, which extend to a greater height than the legs 23. The upper ends of the longitudinally aligned outer row of legs 22 are joined together by a longitudinal top brace 27, which extends from end-to-end of the frame 21, and the other inner longitudinal row of legs 22 are connected by an inner longitudinal brace 28. Said braces 27 and 28 are secured to the upper ends of each of the legs and are each formed of angle iron and includes a horizontally disposed top flange, as best seen in FIGURE 2. The frame 21 additionally includes a plurality of cross braces 29, of angle iron, which extend between the longitudinal frame members 27 and 28 and which are secured thereto and to the transversely aligned legs 22.

A power source, preferably a small electric motor 30 (see top of FIGURE 1) is mounted on and secured to the upper side of the outer longitudinal frame member 27, nearly midway of the ends thereof, and has an inwardly extending drive shaft 31 to which is fixed a belt pulley 32. A short stub shaft 33 is journaled in a bearing 34 which is fixed to the upper side of the frame member 27. Said shaft 33 extends inwardly from the bearing 34 and has a larger belt pulley 35 fixed thereto.

The belt pulley 35 is spaced from and disposed in longitudinal alignment with the belt pulley 32 and is connected thereto by an endless belt 36.

Figure 3:
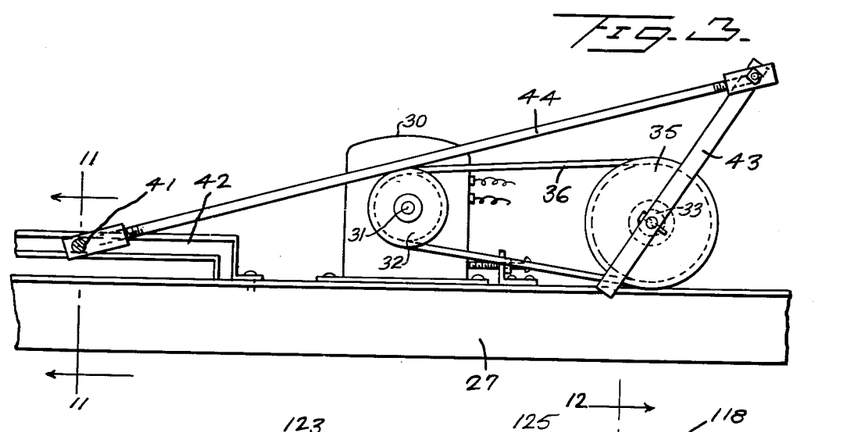
FIGURE 3 is an enlarged fragmentary longitudinal sectional view, taken substantially along a plane as indicated by the line 3—3 of FIGURE 1.

A shaft 37 extends through and is journaled in bearings 38 which are secured to the upper sides of the two end cross braces 29 for supporting said shaft 37 substantially midway between the longitudinal frame members 27 and 28 for reciprocating and oscillating movement. Said shaft 37 is of a length substantially greater than the spacing between the bearings 38 so as to extend beyond both bearings. A collar 39 is turnably mounted on the shaft 37 between two collars 40 which are fixed to said shaft. A rod 41 is fixed to and extends laterally from the collar 39 and has an end slidably engaging in a guide 42, which is secured to the upper side of the frame member 27, as best seen in FIGURES 2 and 3, and which permits the rod 41 to move longitudinally of the frame 21 but which prevents any up and down movement of the rod 41. Thus, the rod 41 prevents turning of the collar 39 with the shaft 37.

Figures 1, 17:
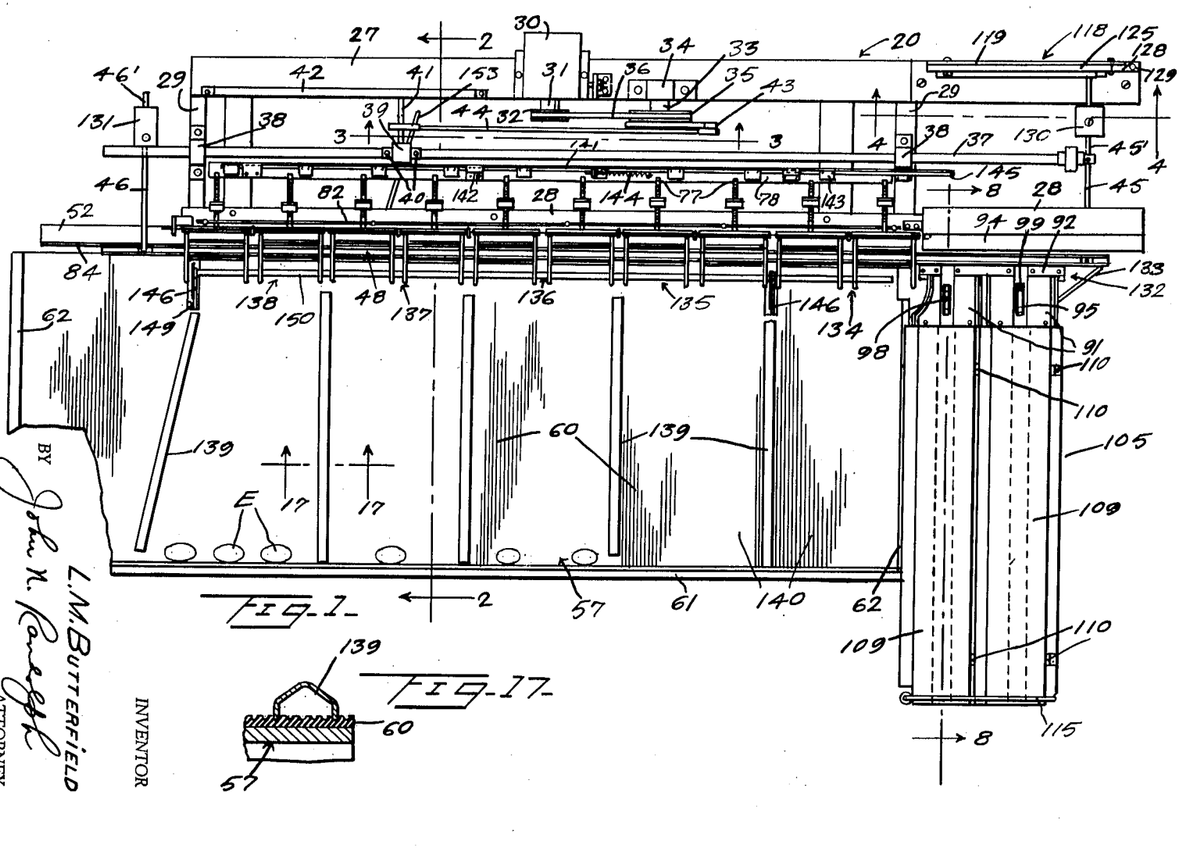
FIGURE 1 is a fragmentary top plan view of the grading machine.
FIGURE 17 is an enlarged fragmentary vertical sectional view, taken substantially along a plane as indicated by the line 17—17 of FIGURE 1.

As best seen in FIGURES 1 and 3, a crank 43 is secured to the shaft 33 and disposed against the inner side of the pulley 35 to rotate therewith. A connecting rod 44 has one end pivotally connected to the outer end of the crank 43 and the other end pivotally connected to the rod 41 for imparting a reciprocating motion to the rod 41 and shaft 37 by rotation of the crank 43 with the pulley 35. Said crank 43 and the connecting rod 44 are disposed between the pulleys 32 and 35 and the shaft 37.

Arms 45 and 46 are secured through the end portions of the shaft 37, beyond the bearings 38, and have portions extending away from the frame side 27, and across the frame side 28. Said portion of the arm 45 is bent downwardly and terminates in an upturned terminal 47 which extends upwardly through an end portion of an article carrier 48, to which said end is rigidly secured, preferably by being threaded to receive a nut 49. Said arm portion extends under and is spaced from an end of the inner frame member 28. The complementary portion of the other arm 46, as seen in FIGURE 2, is offset upwardly and has a downturned terminal end 50 which extends downwardly through and is secured to the other end of the carrier 48, also preferably by a nut fastening 49. Said upwardly offset portion of the arm 46 extends across and is spaced upwardly from a part of the brace 28.

The shorter frame legs 23 are likewise arranged in two longitudinal rows which are transversely spaced from one another and from the inner row of legs 22, in a direction away from the outer row of legs 22. The frame includes braces 51 of angle iron which are secured to transversely aligned legs 23 and which are connected to the adjacent inner legs 22, by a long brace 52 of angle iron which is secured to a number of the aligned inner legs 22. Said cross braces 51 are inclined downwardly away from the longitudinal brace 52, as best seen in FIGURE 2. A longitudinal brace member 53 of the frame 21, which is likewise formed of angle iron, is supported on and secured to the outer row of legs 23. A longitudinally extending bar 54 is supported on the cross braces 51 and is disposed between and spaced from the braces 52 and 53, as seen in FIGURE 2. Short posts 55 are fixed to and rise from the brace 53, and threaded bolts 56 are anchored in and rise from the bar 54.

An elongated tray 57 is demountably supported on the upper edge of the bar 54 and on the upper ends of the posts 55 and is inclined laterally downward from its inner longitudinal edge 58 to the outer edge thereof. The bolts 56 extend upwardly through openings of the tray 57 and have their upper ends engaged by nuts 59 for securing the tray in its applied position of FIGURES 1 and 2. The tray 57 is lined on its upper side with a cushioning mat 60, preferably formed of rubber, portions of which overlie and cover the nuts 59 and the upper ends of the bolts 56. The tray has an upwardly extending rubber covered outer longitudinal wall 61 and upwardly extending rubber covered end walls 62.

A bar 63 (see FIGURES 2 and 6) is disposed on and extends longitudinally of the horizontal top flange of the brace 28 and is suitably secured thereto. A bar 64 is secured to the upper side of the bar 63 and extends longitudinally thereof. Said bar 64 is provided with longitudinally spaced upwardly extending pins 65 each having an upper portion tapering to a point 66.

Figure 6:
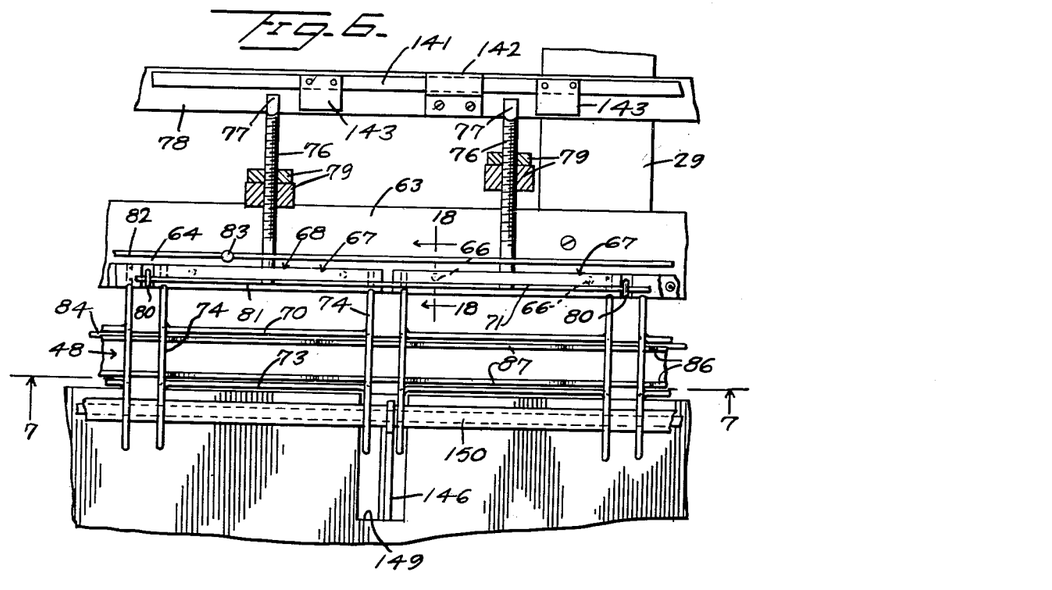
FIGURE 6 is a fragmentary top plan view of a portion of the machine, on an enlarged scale.

A plurality of weighing scales of the tiltable type shown in FIGURE 6, each designated generally 67, are disposed in side by side relation to one another above the bar 63. Each scale 67 includes an elongated bar 68 which is substantially square or rectangular in cross section and which is provided with two conical shaped sockets 69 opening outwardly of an underside thereof and disposed in longitudinally spaced relation to one another for receiving the tapered upper ends of two adjacently disposed pins 65 for supporting the scale 67 for tilting movement about an axis disposed longitudinally of the bar 68. A rod 70 extends substantially parallel to and is spaced outwardly from a forward side 71 of the bar 68 and has inturned ends 72 which are anchored in the bar 68 and project from said forward side 71 thereof. A longer rod includes a straight intermediate part forming a rod portion 73 which is spaced from and disposed substantially parallel to the rod portion 70, and at a greater distance from the bar 68 than said rod portion 70. Said last mentioned rod has corresponding upwardly extending and outwardly bowed arch portions 74, corresponding ends of which form angular extensions of the ends of the rod portion 73, and the other ends of which arch portion 74 constitute outturned terminals 75 which are anchored in the bar 68 and project from the front side 71 thereof above the rod ends 72. Each scale 67 also includes a threaded rod 76 which extends from the opposite rear side of the bar 68, which is disposed substantiallly perpendicular thereto, and approximately midway of the ends of the bar. Each rod 76 has a flattened free end 77 which normally rests on a longitudinally extending rail 78 of the frame 21. The rail 78 is disposed between the frame members 27 and 28 and is supported by two of the cross braces 29 and is of a length to terminate between the bearings 38, as seen in FIGURE 1. Engagement of the rod ends 77 with the rail 78 limits rocking movement of the scales 67 in a direction for elevating the rod portions 70 and 73, which constitute the article supporting elements of the scales 67. Each rod 76 has one or a pair of counterweights 79 threadedly mounted thereon and which are adjustable for varying the amount of weight which the scale 67 is capable of supporting upon the article supporting elements 70 and 73, without the scale being tilted about its fulcrum 66 for lowering said article supporting elements.

Posts 80 (FIGURES 2 and 6), having eyes at their upper ends, are fixed to and rise from the bar 64, between certain of the bars 68. A rod 81 extends through said posts 80 and is supported thereby above and spaced slightly from all of the scale bars 68, and adjacent the front faces 71 of said scale bars, to permit the scales 67 to tilt to their dotted line positions of FIGURE 2, but to prevent the scales being lifted from the pins 65 without first removing the rod 81 from the posts 80. Another rod 82 extends through and is supported by posts 83, which posts rise from and are fixed to the bar 63. The rod 82 extends across each of the rods 76 and is disposed to limit upward swinging movement of said rods 76 and tilting movement of the scales to their dumping, dotted line positions of FIGURE 2.

The article carrier 48, shown in FIGURE 2, is of U-shape cross section and extends substantially from end-to-end of the frame 21 and is of a width to move freely between the article supporting elements 70 and 73 of the scales 67, and up and down between the inner longitudinal edge 58 of the tray 57 and a kicker plate 84. Said plate 84 extends from end-to-end of the scale 67 and to beyond the scale 67 located nearest the arm 46, so that the kicker plate is substantially coextensive with the tray 57. The kicker plate 84 has a bottom edge portion secured by fastenings 85 to the longitudinal frame brace 52 and extends upwardly therefrom between the bar 63 and the adjacent side of the carrier 48, and terminates below the article supporting scale elements 70, in the normal raised positions of said elements, as seen in full lines in FIGURE 2.

Figures 7, 13, 14, 15:
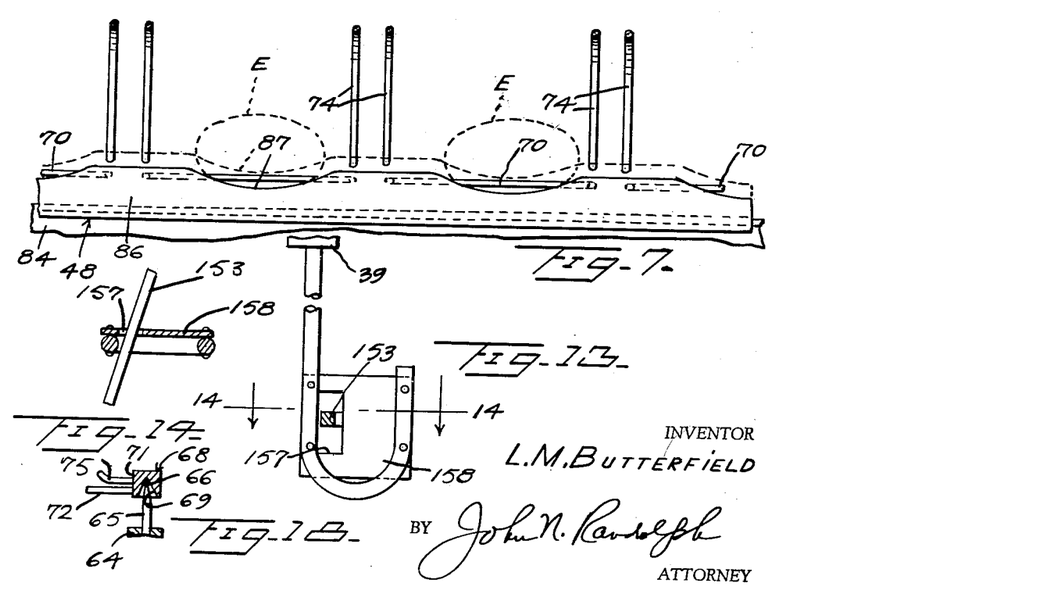
FIGURE 7 is a vertical sectional view taken substantially along a plane as indicated by the line 7—7 of FIGURE 6.
FIGURE 13 is an enlarged fragmentary vertical sectional view, taken substantially along the line 13—13 of FIGURE 2.
FIGURE 14 is a fragmentary substantially horizontal sectional view, taken substantially along the line 14—14 of FIGURE 2.

The article carrier 48, shown in FIGURE 7, is of channel shape cross section and has corresponding upstanding substantially parallel side walls 86, the upper edges of which are provided with transversely aligned downwardly curved depressions 87. Each two transversely aligned depressions 87 form an article receiving pocket of the carrier 48.

Figure 8:
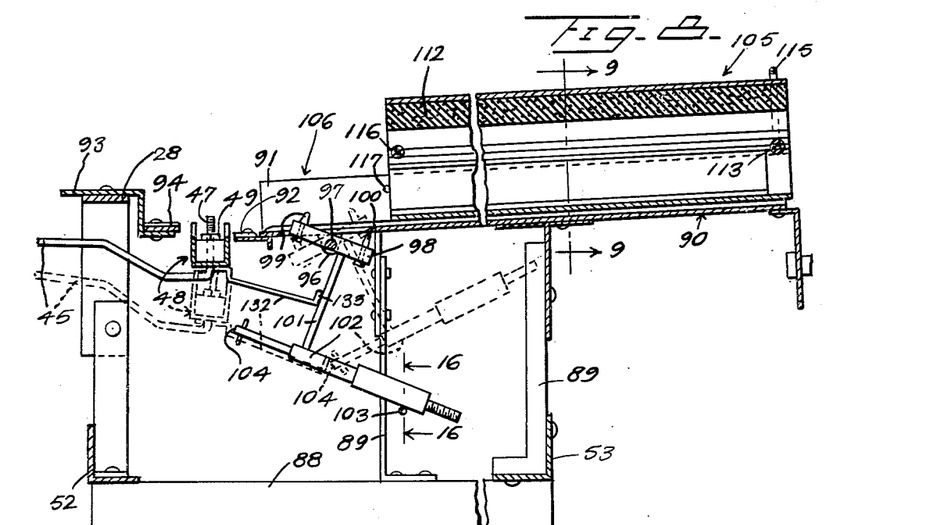
FIGURE 8 is an enlarged fragmentary transverse sectional view through a portion of the machine, taken substantially along a plane as indicated by the line 8—8 of FIGURE 1.
Figures 9, 16:
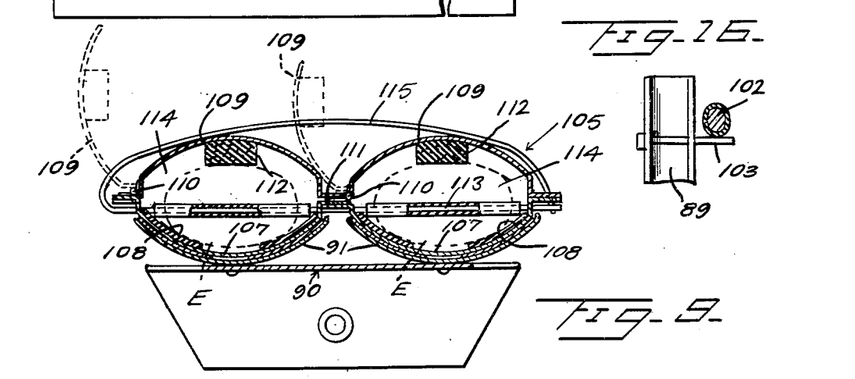
FIGURE 9 is a cross sectional view through the feeder unit, taken substantially along a plane as indicated by the line 9—9 of FIGURE 8.
FIGURE 16 is an enlarged fragmentary vertical sectional view taken substantially along a plane as indicated by the line 16—16 of FIGURE 8.

The longitudinal frame members 52 and 53 provide supports for cross braces 88, one of which is shown in FIGURE 8, and which are located at the right hand end of the machine 20, as seen in FIGURE 1. Legs 89 are fixed on and rise from the cross braces 88 and the brace 53 to provide supports for a chute member 90 which is disposed crosswise of the machine 20 and which includes two downwardly and inwardly inclined chute portions 91 of arcuate cross section, as best seen in FIGURE 9. The chute member 90 has a bar 92 extending across the lower inner end thereof and which is disposed substantially parallel to the carrier 48. A part of the frame member 28, which is disposed opposite said bar 92 and beneath which the arm 45 is disposed, is upwardly offset, as seen in FIGURE 8, and supports a bracket 93. A bar 94 is attached to a downwardly offset part of the bracket 93 and is disposed parallel to the bar 92 and is spaced therefrom so that an end portion of the carrier 48 can move freely between the bars 92 and 94. Said bar 94 is offset upwardly relative to the bar 92, for a purpose which will hereinafter become apparent. The bars 92 and 94 combine to form a loading station of the machine 20 to which the articles to be graded are supplied from the chute 90, as will hereinafter be described.

Figure 10:
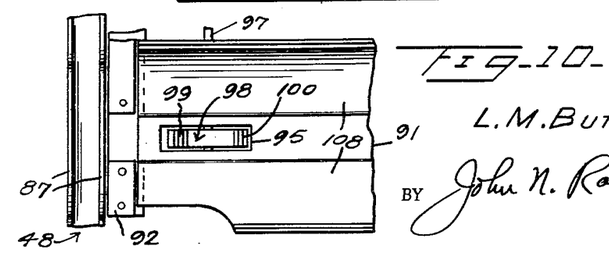
FIGURE 10 is a fragmentary top plan view of a portion of the article feeding unit.

As seen in FIGURES 8 and 10, the two chute portions 91 are provided with longitudinally elongated openings 95 near their lower ends. Bearings 96 extend downwardly from parts of the chute portions 91 for journaling a shaft 97. Two bars 98 are fixed intermediate of their ends to the shaft 97 and so that the end portions of the bars are capable of rocking up and down through the openings 95 beneath which said bars 98 are disposed. The bars 98 have stop members 99 projecting upwardly from the ends thereof located nearest the rail 92 and stop members 100 projecting upwardly from the opposite ends thereof. A hanger 101 is fixed to and extends downwardly from one of the bars 98 between the shaft 97 and the stop 100 thereof. A weighted rod 102 is secured to and disposed crosswise of the lower end of the hanger 101 and is weighted to cause the outer end of said rod 102 to swing downwardly and rest against a stop 103 which is supported by and projects laterally from one of the supporting legs 89, as best seen in FIGURE 16. In this normal position of the weighted rod 102, the inner end 104 thereof is elevated and the two bars 98 are inclined so that the inner ends thereof, from which the stops 99 project, are in elevated positions and extend upwardly through the openings 95 while the other stops 100 are disposed below the chute portions 91.

The chute 90 combines with an article holder, designated generally 105, to form the article feeder, designated generally 106. Said article holder 105 includes a bottom composed of two channel portions 107 each of which is elongated and of arcuate cross section, and the inner side of each of which is preferably provided with longitudinally extending cushioning strips 108. The article holder 105 includes two longitudinally elongated transversely bowed cover members 109 each of which is hingedly connected along a longitudinal edge thereof by hinges 110 to a part of the bottom half of the article holder 105. The hinges 110 of one cover member 109 are secured to one side edge portion in the bottom section of the holder and the hinges 110 of the other cover 109 are secured to an intermediate part 111 of the bottom section, which is disposed between said channel portions 107. Each cover member 109 is preferably provided with a longitudinally extending internally disposed cushioning strip 112. A rubber covered rod 113 is supported by the bottom section of the holder 105 and spans the upper ends of the two channel portions 107 to provide stops for the upper ends of the two elongated receptacle portions 114, each of which is formed by a channel portion 107 and a cover 109. A bail 115 has end portions journaled in the bottom section of the holder 105 and is disposed at the upper end thereof and is swingable over the two covers 109 for normally holding said covers in a closed position, and may be swung clockwise from the position thereof as seen in FIGURE 8 out of engagement with the covers 109, so that said covers can be swung to their open dotted line positions, as seen in FIGURE 9. Each cover 109 has a rubber covered bar 116 supported thereby and spanning the lower end thereof, and which bars 116 form stops for the lower ends of the receptacles 114, when the covers 109 are in closed positions, as seen in FIGURE 8. The holder 105 is primarily adapted for use in collecting and holding eggs. Eggs can be gathered and placed in the holder 105 and do not have to be thereafter touched until the grading of the eggs has been completed by the machine 20. Obviously, a number of the holders 105 can be carried filled in a container, not shown, and when ready for use a holder 105 is placed upon the two chute portions 91 with the bottom portions 107 thereof resting in the chute portions 91 and with the lower end of the holder 105, across which the closure rods 116 extend, disposed above but adjacent the openings 95. The chute portions 91 may be provided with pins 117, as seen in FIGURE 8, against which lower ends of the bottom portions 107 can bear to correctly position the holder 105 on said chute portions 91, as seen in FIGURES 1 and 8. By then swinging the bail 115 to a released position and moving the covers 109 to their open dotted line positions, the lower end stops 116 will swing upwardly with the covers to positions so as not to obstruct the lower ends of the channel portions 107. Thus, the eggs can roll down said channel portions 107 and a lowermost egg from each channel portion will engage and be stopped by each upwardly extending stop element 99. Said two lowermost eggs will be disposed across the openings 95, one in each channel.

Figures 4, 11, 12:
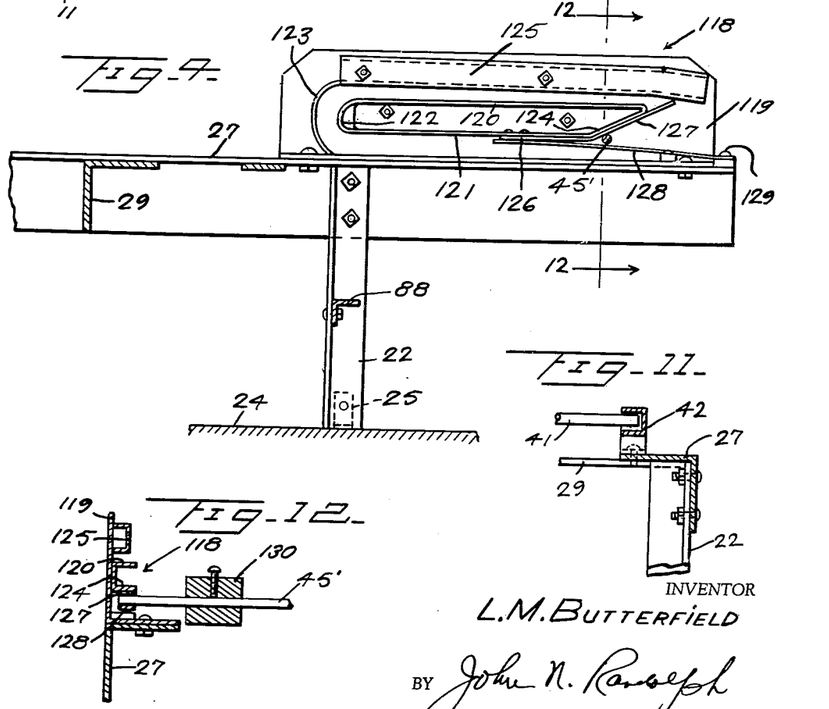
FIGURE 4 is an enlarged fragmentary longitudinal sectional view, taken substantially along a plane as indicated by the line 4—4 of FIGURE 1.
FIGURE 11 is a fragmentary cross sectional view, taken substantially along a plane as indicated by the line 11—11 of FIGURE 3.
FIGURE 12 is a fragmentary cross sectional view, taken substantially along a plane as indicated by the line 12—12 of FIGURE 4.

A cam guide 118 is supported by the frame member 27 opposite to the article feeder 106, as best seen in FIGURE 1. Said cam guide 118 includes a plate 119 which is fixed to and rises from the frame member 27, as seen in FIGURE 4. Fixed to the inner side of the plate 119 is a top rail 120 and a bottom rail 121. An arcuate rail portion 122 connects the inner ends of the rails 120 and 121 and an arcuate guide portion 123 is disposed around and spaced from the rail portion 122. The bottom rail 121 has an upwardly inclined outer end 124 which merges with the terminal of the upper rail 120. A top guide bar 125 is secured to the inner side of the plate 119 and extends from the upper end of the guide member 123 to beyond the outer end of the upper rail 120 and is disposed above and spaced from said upper rail. A leaf spring 126 is secured to the underside of the bottom rail 121 and has an upwardly inclined free end 127 bearing against the upwardly inclined rail portion 124 and having its terminal extending therebeyond and bearing against the underside of the bar 125. The outer end of a second leaf spring 128 is secured by a fastening 129 to the outer end of the frame member 27 and extends inwardly therefrom and has a free end bearing against the secured end of the leaf spring 126 and which contacts the underside of the rail 121.

The other end 45' of the arm 45 extends from the shaft 37 toward the guide 118 (see FIGURE 1) and has its terminal disposed for movement in the guide 118. A counterweight 130 is adjustably secured to the arm portion 45' and another counterweight 131 is adjustably secured to the arm portion 46', which arm portion likewise extends from the shaft 37 in a direction away from the carrier 48. Said counterweights 130 and 131 are adapted to counterbalance the weight of the carrier 48 and the articles supported thereby.

The terminal of the arm portion 45' travels from left to right, as seen in FIGURE 4, along the upper side of the top rail 120 for maintaining the carrier 48 in its lowered dotted line position, as seen in FIGURE 2, during its movement from left to right, as seen in FIGURE 1. A cam member 132, as seen in FIGURE 1, is secured to the right hand end of the carrier 48 on the side thereof remote from the guide 118 and is disposed to move under the lower inner end of the chute member 90, as seen in FIGURE 8. During the left to right movement of the carrier 48 while in its lower dotted line position of FIGURES 2 and 8, the cam edge 133 of the cam 132 engages the inner end 104 of the rod 102 for swinging said rod and the hanger 101 from the full line to the dotted line positions thereof, as seen in FIGURE 8, before the cam edge 133 disengages and passes beyond the rod end 104. The bars 98 are thus caused to rock from their full line to their dotted line positions of FIGURE 8 so that the eggs being held by the two lower stops 99 will be released to roll down the chute portions 91 into positions resting on and spanning the space between the loading station bars 92 and 94. The bar 94 is disposed higher than the bar 92 to provide stops for the eggs. Both of said bars are formed of or covered with a cushioning material to prevent breakage of the eggs. As the lower stops 99 swing downwardly, the upper or rear stops 100 swing upwardly so that another egg cannot roll from each bottom portion 107 onto the chute portion 91, forming a continuation thereof. After the cam edge 133 disengages the rod end 104, the weight of the rod causes it to move back to its full line position of FIGURE 8 against the stop 103, to return the bars 98 to their full line positions, so that an egg can roll from each bottom portion 107 onto the chute portion 91, forming an extension thereof, and against the forward stop 99 of said chute portion. It will thus be seen that the eggs are discharged one by one from each chute portion 91 onto the loading station 92, 94, and that an egg is thus supplied by gravity from each chute portion 91 onto the loading station each time that the carrier 48 is moving from left to right of the machine 20, as seen in FIGURE 1, and while in a lowered position. At the same time, the arm portion 45' is traveling over the upper side of the top rail 120 and thereafter moves out of engagement with said top rail and against the free end of the spring 127, for displacing said spring end away from the top bar 125 so that the arm portion 45' can pass therebeyond and said spring end can then resume its position of FIGURE 4. This occurs as the shaft 37 completes its movement from left to right, as seen in FIGURE 1. As the shaft 37 commences to move from right to left, the arm portion 45' moves down the underside of the spring end 127 to cause the shaft 37 to turn slightly in its bearings 38 for rocking the carrier 48 upwardly. As this occurs, the right hand end of the carrier swings upwardly between the loading station bars 92 and 94 and is so disposed that the two eggs, bridging said bars, will be picked up in the two right hand end pockets 87 of the carrier 48. The carrier 48 is shown in FIGURE 8 during its upward movement through the loading station for picking up the eggs and during travel of the arm portion 45' down the underside of the inclined spring end 127, as seen in FIGURE 4. Accordingly, the carrier 48 will rise somewhat above its full line position of FIGURES 2 and 8 as the arm portion 45' continues its downward movement and its subsequent travel between the secured end of the spring 126 and the free end of the spring 128 and, thereafter, its travel along the underside of the bottom rail 121, during all of which movement the carrier 48 and the articles supported and conveyed thereby, will be in elevated positions.

When the arm portion 45' moves beyond the inner end of the bottom rail 121, traveling from right to left as seen in FIGURE 4, the weight of the carrier 48 will cause it to swing downwardly for turning the shaft 37 in the opposite direction in its bearings 38, and so that the arm portion 45' can move upwardly between the guide portions 122 and 123 to thereafter travel in the opposite direction, from left to right as seen in FIGURE 4, above the top rail 120 and while the carrier 48, in its lower dotted line position, is also moving from left to right, as seen in FIGURE 1. During right to left movement of the carrier 48 while in its elevated position, portions of said carrier will move between the article supporting elements 70 and 73 of the weighing scales 67.

The first two weighing scales 67, located nearest the be provided. The two scales of each weighing station 134, the next two weighing scales constitute a second weighing station 135. Five such weighing stations, including the additional weighing stations 136, 137 and 138 are shown, but a greater or lesser number could be provded. The two scales of each weighing station are adjusted to support the same amount of weight without dumping and the weighing scales of each successive weighing station are adjusted to support a progressively lesser weight. The carrier pockets 87 are spaced apart a distance so that the two eggs or articles picked up from the loading station will be deposited upon the article supporting elements 70 and 73 of the two scales 67 constituting the weighing station 134, as the carrier 48 swings downwardly, while the arm portion 45' is swinging upwardly between the guide portions 122 and 123. If the articles thus deposited upon the weighing scales of the station 134 are of sufficient weight, or if either of said articles are of sufficient weight, the scale will be tilted thereby to its dotted line position of FIGURE 2, and as the scale approaches its dotted line position, the egg or article will be engaged by a portion of the upper edge of the kicker plate 84 and will be displaced thereby over the outer article supporting element 73 and onto the tray 57. If either or both of the eggs are not discharged onto the tray 57 by tilting of the scale or scales of the weighing station 134, said egg or eggs will be picked up from the weighing station 134 by another pocket or pockets 87 of the carrier 48, as said carrier is again swinging upwardly for picking up two eggs from the loading station, and the egg or eggs picked up at the weighing station 134 will be deposited upon a scale or scales of the weighing station 135. The eggs will thus be progressively moved to the different weighing stations until each egg can tilt a scale of one of the weighing stations and be discharged therefrom onto the tray 57 and thus graded. Very small eggs which are not of sufficient weight to tilt one of the scales 67 of the last weighing station 138 will be discharged from the carrier 48, after being picked up from a scale of the weighing station 138, as the two left hand end pockets 87 move downwardly adjacent the left hand end of the kicker plate 84, and which is disposed beyond the last weighing station 138, as seen in FIGURE 1. Such eggs will be discharged into the left hand end of the tray 57.

Divider strips 139 are supported on the tray 57 for dividing said tray into separate compartments or sections 140 for separating the eggs graded at the different weighing stations. Said divider strips 139 can be adjustably positioned on the tray 57 to vary the size of the different compartments or sections 140 of said tray.

A rod 141 is slidably mounted above the longitudinal frame members 78 in guides 142 which are secured to the member 78. Said rod has rigid strips 143 fixed to and projecting laterally from an upper side thereof toward the scales 67, and which strips are disposed in longitudinally spaced relation to one another. A pull spring 144, FIGURE 1, is attached to the rod 141 and is anchored to a part of the frame member 78 for urging said rod 141 to move from left to right, as seen in FIGURE 1, for positioning the strips 143 in staggered relation to the ends 77 of the weighing scales and so that said scales are free to tilt. The right hand end 145 of the rod 141 is disposed to be engaged by the arm 45 as the carrier 48 approaches the extremity of its right to left movement in an elevated position, for moving the rod 141 from right to left to position the stop strips 143 over the rod ends 77, while the carrier 48 is swinging downwardly for depositing the eggs on the article supporting elements 70 and 73 of the scales. Thus, the scales are locked against tilting while the articles are deposited thereon so that the scales cannot be tilted to discharging positions partially by the inertia of the downwardly moving articles. Thereafter and as the arm portion 45 moves from left to right, it will disengage the rod end 145 so that the spring 144 can quickly move said rod 141 to move the stop strips 143 out of engagement with the scale portions 77, so that the scales can thereafter be tilted, but solely by the weight of the articles supported thereby.

Figure 5:
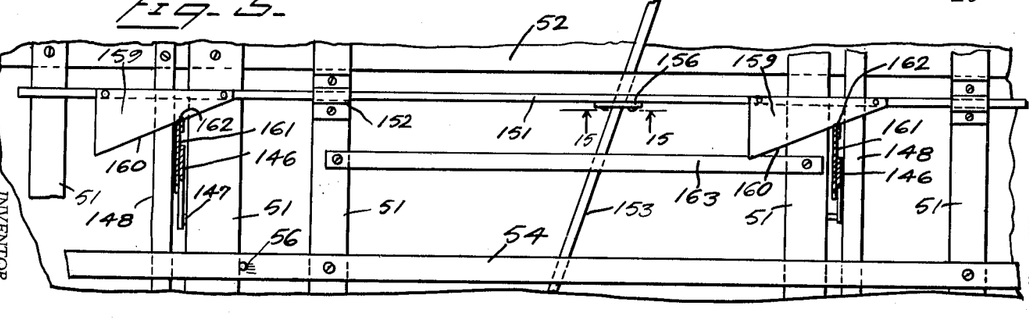
FIGURE 5 is an enlarged fragmentary horizontal sectional view taken substantially along the line 5—5 of FIGURE 2.

Two levers 146 are pivotally connected by fastenings 147, at their lower ends, to two of the frame legs 23, which are disposed adjacent the legs 22. The levers 146 extend upwardly at an incline toward the weighing scales 67 and are each disposed for transverse swinging movement relative to the frame 21 between one of the cross braces 51 and an adjacent cross brace 148, as seen in FIGURE 5. The upper portions of the levers 146 extend loosely through and are swingably disposed in transverse slots 149 of the tray 57, as seen in FIGURE 1. A rubber covered rod 150 extends through and is supported by the upper ends of the levers 146 and is disposed on the upper side of the tray 57. The rod 150, in its normal position, is located in close proximity to the inner edge 58 of the tray, so that the graded eggs will be discharged thereover onto the tray compartments 140.

A rod 151 is slidably mounted in guides 152 which are supported on certain of the cross braces 51, so that said rod is disposed inwardly relative to the upwardly inclined levers 146. A long lever 153 is pivotally connected at an outer end thereof by a fastening 154, as seen in FIGURE 2, to the frame member 53. Said lever 153 extends laterally from its pivot 154 through an opening 155 in a plate 156. The plate 156 is secured to and depends from a part of the rod 151. The free end portion of the lever 153 extends loosely through an opening 157 in a hanger 158 which is secured to and depends from the collar 39. Thus, reciprocating movement of the shaft 37 will produce an oscillating movement of the lever 153 and a reciprocating movement of the rod 151. Two cam members 159 are secured to and project laterally from the rod 151 in spaced apart relation to one another and are provided with corresponding cam edges 160 which are disposed at a slight angle to the axis of the rod 151. Plates 161 are secured to the levers 146 and have inner edges 162 disposed in the path of movement of the cam edges 160 when the rod 151 is moved from left to right, as seen in FIGURE 5.

Thus, after the eggs have been deposited upon the scales 67 and the scales have been unlocked and have had an opportunity to tilt to discharge the eggs therefrom onto the tray compartments 140, and as the carrier 48 is approaching the extremity of its left to right movement, as seen in FIGURE 1, the lever 153 will have swung sufficiently from left to right, as seen in FIGURE 5, to cause the cam edges 160 to engage the plate edges 162 for swinging the levers 146 upwardly from right to left, as seen in FIGURE 2, toward upright positions. This will cause the pusher rod 150 to swing away from the inner tray edge 58 for pushing any of the eggs which have not rolled down the tray compartments, toward the lower ends of said compartments and away from the weighing scales 67. The levers 146 are not swung from their positions of FIGURE 2 as far as upright positions. Thus, when the rod 151 moves in the opposite direction or from right to left with the shaft 37, the weight of said levers 146 and the rod 150 will cause said parts to swing clockwise back to their positions of FIGURE 2. As seen in FIGURE 5, the right hand cam 159 rides on a rail 163 which is supported by two of the braces 51.

While the machine 20 has been described particularly in connection with its preferred use for grading eggs E, it will be understood that the machine 20 is not limited to such use and may be utilized for grading various other articles by weight which are capable of rolling or sliding down the feeder unit 106 onto the loading station 92, 94.

Various modifications and changes are contemplated and may be resorted to, without departing from the function or scope of the invention as hereinafter defined by the appended claims.

I claim as my invention:

1. A machine for grading articles by weight comprising, a frame, bearings secured to the frame, a shaft journaled in the bearings, an elongated narrow carrier having upwardly opening longitudinally spaced article receiving pockets, means rigidly connecting the carrier to the shaft for supporting the carrier on one side of an substantially parallel to the shaft, a member swively and nonslidably connected to the shaft, means connected to said member for imparting a reciprocating movement to the shaft and carrier, cam means connected to the shaft for oscillating the shaft during its reciprocating movement to effect an up and down rocking movement of said carrier, a plurality of weighing stations supported on the frame longitudinally of the carrier and each including a tiltable weighing scale having transversely spaced article supporting elements between which portions of the carrier are freely movable, a slotted loading station spaced from the weighing stations and through which an end portion of the carrier is freely movable, means for feeding the articles by gravity onto the loading station in a position to be picked up in a pocket of the carrier during upward rocking movement of the carrier for conveyance by the carrier while in an elevated position, certain of said pockets being spaced apart a distance equal to the length of movement of the carrier and equal to the spacing between corresponding ends of adjacent weighing stations and the spacing between the pickup point of the loading station and the deposit point of the weighing station, located adjacent thereto, whereby an article picked up at the loading station is conveyed to a first weighing station and an article simultaneously picked up at any of the weighing stations is simultaneously conveyed to the next weighing station, in a direction away from the loading station, for deposit of the articles onto said transversely spaced article supporting elements of the weighing scales as the carrier is rocked downwardly, and said weighing scales having counterweights permitting the article supporting elements thereof to be titled downwardly by progressively decreasing weights from said loading station, for sorting the articles by weight as the articles are intermittently conveyed by the carrier and successively deposited upon the weighing scale, the articles being discharged laterally from the tilted article supporting elements of the weighing scales.

2. A machine for grading articles by weight as in claim 1, locking means normally disposed in an unlocked position and intermittently moved momentarily to a locking position for locking each of the weighing scales against tilting movement during downward displacement of the carrier for depositing the articles from the carrier pockets onto the supporting elements of the weighing scales.

3. A machine for grading articles by weight as in claim 2, said locking means being supported for reciprocating movement by the frame, a spring urging the locking means to an unlocked position, and a part of said locking means being disposed to be engaged by the means connecting the shaft and carrier for moving said locking means to a locking position.

4. A machine for grading articles by weight as in claim 1, a tray supported by said frame to one side of the carrier and weighing stations and having sections disposed in alignment with the weighing stations for receiving the graded articles therefrom, a pusher member disposed on the upper side of said tray and normally positioned adjacent said weighing scales for discharge of the articles from the weighing scales onto the tray over said pusher member, means supporting said pusher member for reciprocating movement over a part of the tray away from and toward said weighing stations, and means for intermittently actuating said pusher member including a part connected to said shaft, said pusher member displacing the articles deposited onto the tray away from the weighing scales.

5. A machine for grading articles by weight as in claim 1, said means for feeding the articles by gravity including a stationary chute member supported by the frame and inclined downwardly toward said loading station, and an elongated article holder demountably supported on said stationary chute member and adapted to contain the articles to be supplied by gravity to the loading station.

6. A machine for grading articles by weight as in claim 5, said article holder including hingedly connected top and bottom sections, said bottom section of the holder resting upon said stationary chute member, and said holder including a stop carried by an end portion of the top section and movable therewith to a position for exposing the lower end of the bottom section for discharge of the articles by gravity therefrom when the cover is swung to an open position.

7. A machine for grading articles by weight comprising a frame, at least two tiltable weighing scales mounted for independent rocking movement on said frame about aligned axes, each of said scales having transversely spaced article supporting elements at one end thereof, said article supporting elements of the scales being disposed in alignment with one another, a shaft, means mounting said shaft on the frame for reciprocating and oscillating movement relative to the frame about an axis disposed parallel to the axes of rocking movement of said scales, an elongated narrow carrier, means rigidly connecting the carrier to the shaft for supporting the carrier on one side of and substantially parallel to the shaft, means connected to said shaft and operable for reciprocating the shaft and carrier, cam means connected to the shaft and frame for oscillating the shaft during its reciprocating movement to effect an up and down rocking movement of said carrier, said carrier being disposed for horizontal reciprocating and vertical oscillating movement between the article supporting elements of the scales, and the axes of rocking movement of said scales being disposed between the shaft and carrier.

References Cited in the file of this patent

UNITED STATES PATENTS

| | | |
|---|---|---|
| 2,160,319 | Swartz | May 30, 1939 |
| 2,246,597 | Niederer | June 24, 1941 |
| 2,381,035 | Campbell | Aug. 7, 1945 |
| 2,646,168 | Niederer | July 21, 1953 |
| 2,687,802 | Davis | Aug. 31, 1954 |